Patented June 6, 1933

1,912,695

UNITED STATES PATENT OFFICE

WILLIAM ENGS AND RICHARD Z. MORAVEC, OF BERKELEY, CALIFORNIA, ASSIGNORS TO SHELL DEVELOPMENT COMPANY, OF SAN FRANCISCO, CALIFORNIA, A CORPORATION OF DELAWARE

PRODUCTION OF ALCOHOL FROM OLEFINES

No Drawing.   Application filed February 9, 1931.   Serial No. 514,695.

This invention relates to the production of alcohols from mixtures containing the corresponding olefine by contact with sulphuric acid, more particularly to the production of secondary butyl alcohol. The process of the invention consists in the contacting of substantially equimolecular proportions of olefine containing more than three carbon atoms with sulphuric acid of 90% to 100% concentration at normal temperature.

We will describe our invention more particularly in relation to the production of secondary butyl alcohol, without, however, limiting ourselves thereto as this is only one example of the possible applications of our invention.

It is known that when isomeric 1 and 2 butenes, which are gases at ordinary temperature and pressure, are absorbed in sulphuric acid, they react with the acid to form butyl hydrogen sulphate, which, on hydrolysis, yields secondary butyl alcohol. This is the basis of existing processes for the production of this commercially valuable alcohol, in which butene, usually as a gas, is passed through the acid. It is further known that for successful operation of these processes the strength of the sulphuric acid is an important factor. If concentrated acid of 90% or more $H_2SO_4$ is employed, a large part of the butene or of the formed butyl hydrogen sulphate is polymerized, and some tarry resinous bodies are formed by side reactions. It has therefore always been considered necessary to use a more or less diluted acid. On the other hand, the acid must not be too dilute since the more dilute the acid, the slower is its reaction with butene. According to all publications and patents mentioning the concentration of the acid to be used, an acid of 75% to 85% is most advantageous, as giving a reasonable reaction rate and at the same time avoiding undesirable side reactions in the absorption of the butene. Further, it is mentioned to be advisable to operate at a temperature below zero, even as low as $-20°$ or $-25°$ C., when it is intended to use a somewhat stronger acid.

We have now discovered that when concentrated sulphuric acid is caused to react with 1 or 2 butene while there is present substantially one molecule of butene, or slightly less, to each molecule of acid, the reaction produces chiefly butyl hydrogen sulphate, the conversion taking place without appreciable side reactions or polymer formation. The concentration of sulphuric acid most advantageous for this reaction is from 90% to 100%, a concentration which has previously been regarded as conducive to polymerization and other side reactions and therefore objectionable for reaction with butene.

By passing gaseous butene through the acid, as hitherto practiced, it is impossible to maintain throughout the reaction zone the requisite proportion of butene to acid and side reactions occur. In order to insure the requisite quantity of butene in contact with the acid, we have preferably used liquid butene and agitated this violently with sulphuric acid in order to produce an intimate emulsion of the desired proportions. It will be understood that this has to be done under sufficient pressure to keep the butene in liquid condition. Preferably, we use just sufficient pressure. We find that for our process it is not necessary to use low temperatures; we have successfully operated at temperatures up to 60° F. We prefer not to use higher temperatures, as above 60° F. side reactions begin to occur and the yield of butyl hydrogen sulphate progressively decreases. Without wishing to limit ourselves to such an explanation we believe that the reaction speed at which butyl hydrogen sulphate is formed, by contacting concentrated acid with an equimolecular weight of butene, is so great as to preclude the undesirable side reactions. This high reaction speed is the result of the high acid concentration, together with the intimate contact of the requisite proportions of the reacting materials. The increase in the reaction speed is illustrated by the following: when liquid butene is violently agitated with 80% sulphuric acid to form butyl hydrogen sulphate, the reaction is comparatively slow and requires 30 to 40 minutes for completion, but when an equimolecular weight of butene is agitated in the same way with 90% to 100% sulphuric acid, the reaction is completed almost instantaneously.

The reaction may be continuously carried out in an agitator supplied with suitable agitating means and cooling means, the latter being adapted to prevent the temperature of the strongly exothermic reaction solution from rising above 60° F. as side reactions begin to occur above that temperature.

The reaction may be successfully carried out as well with pure 1 and 2 butene or with mixtures containig butene such as for example, with the appropriate fraction obtained by liquefaction and fractional distillation of the gases from a petroleum cracking plant, this fraction containing butane together with butene. It is preferable that iso-butene and all other olefines containing a carbon atom with no hydrogen attached to it, are as far as possible removed from the mixture before contacting it with concentrated sulphuric acid, as the reaction thereof with such acid is very violent, although their presence in small quantities will not effect the efficacy of the process. These iso-olefines can be removed by known methods as by fractionation or by a preliminary treatment with weak acid of 65% to 70% concentration, or by some polymerizing agent as fuller's earth.

The ethereal salt, acid butyl sulphate, is hydrolyzed by an acidified aqueous solution, preferably water that contains 25% acid.

When liquid fractions of petroleum containing butene are contacted with concentrated sulphuric acid in a continuous manner in accordance with our invention, it is preferable to receive the resulting butyl hydrogen sulphate together with butane and dibutyl sulphate, if any is formed, in a suitable vessel, appropriately cooled by suitable refrigerating means so that the temperature of the liquid mixture does not rise above 60° F.—the decomposition temperature of the butyl hydrogen sulphate. The liquid mixture in the vessel separates into two liquid phases, the upper layer comprising essentially butane and the lower butyl hydrogen sulphate. Any dibutyl sulphate, if formed, is found dissolved in both layers. The lower layer is separated from the upper layer by any convenient mode and is then hydrolyzed by an acidified aqueous solution containing about 25% acid, or by dilution to an acidity of 25-35%. The amount of dibutyl sulphate in the lower layer is quite small and forms a layer on the surface of the dilute acid product which is removed in any suitable manner and subsequently converted to secondary butyl alcohol.

More specifically, the reaction product of 1 and 2 butene and concentrated sulphuric acid is diluted to an acidity of 25% and heated to liberate the secondary butyl alcohol. The alcohol is then distilled from the acid in its constant boiling mixture with water. This azeotropic mixture is partially dehydrated by any method, as by "salting out", and the resulting alcohol layer distilled to obtain the anhydrous product.

The method of our invention is equally applicable to the olefines of higher molecular weight than butene.

While we have in the foregoing described in some detail the preferred embodiment of our invention and some variants thereof, it will be understood that this is only for the purpose of making the invention more clear and that the invention is not to be regarded as limited to the details of operation described, nor is it dependent upon the soundness or accuracy of the theories which we have advanced as to the reasons for the advantageous results attained. On the other hand, the invention is to be regarded as limited only by the terms of the accompanying claims, in which it is our intention to claim all novelty inherent therein as broadly as is possible in view of the prior art.

We claim as our invention:

1. A process for producing alcohols from secondary olefines containing at least four carbon atoms to the molecule comprising contacting the olefines with concentrated sulphuric acid in substantially equimolecular proportions for a period sufficient to effect sulfation but insufficient to effect substantial polymerization of said olefines and hydrolyzing the corresponding alkyl hydrogen sulfates formed.

2. A process for producing alcohols from secondary olefines containing at least four carbon atoms to the molecule comprising contacting the olefines with concentrated sulfuric acid in substantially equimolecular proportions at about normal temperature for a period sufficient to effect sulfation but insufficient to effect substantial polymerization of said olefines and hydrolyzing the corresponding alkyl hydrogen sulfates formed.

3. A process for producing alcohols from secondary olefines containing at least four carbon atoms to the molecule comprising contacting the olefines with sulphuric acid of 90% to 100% concentration in substantially equimolecular proportions for a period sufficient to effect sulfation but insufficient to effect substantial polymerization of said olefines and hydrolyzing the corresponding alkyl hydrogen sulphates formed.

4. A process for producing alcohols from secondary olefines containing at least four carbon atoms to the molecule comprising contacting the liquefied olefines with concentrated sulfuric acid under pressure at about normal temperature in substantially equimolecular proportions for a period sufficient to effect sulfation but insufficient to effect substantial polymerization of said olefines and hydrolyzing the corresponding alkyl hydrogen sulfates formed.

5. A process for producing alcohols from secondary olefines containing at least four carbon atoms to the molecule comprising removing any iso-olefines present, thereafter contacting the olefines with sulphuric acid of 90% to 100% concentration in substantially equimolecular proportions for a period sufficient to effect sulfation but insufficient to effect substantial polymerization of said olefines and hydrolyzing the corresponding alkyl hydrogen sulfates formed.

6. A process for producing alcohols from a mixture of paraffins and olefines containing secondary olefines possessing at least four carbon atoms to the molecule comprising removing from the mixture any iso-olefines present, thereafter contacting the mixture of paraffins and olefines with sulphuric acid of 90% to 100% concentration in the proportion of about one molecule of olefine to each molecule of acid present for a period sufficient to effect sulfation but insufficient to effect substantial polymerization of said olefines and hydrolyzing the corresponding alkyl hydrogen sulfates formed.

7. A process for producing secondary butyl alcohol from a mixture of butane and butene comprising removing from the mixture any iso-butene present, thereafter contacting the mixture of butane and butene with sulfuric acid of 90% to 100% concentration in the molecular proportion of about one molecule of butene to each molecule of acid present for a period sufficient to effect sulfation but insufficient to effect substantial polymerization of said butene and hydrolyzing the butyl hydrogen sulfate formed.

8. A process for producing secondary butyl alcohol from 1 and 2 butene comprising contacting the butene with sulfuric acid of 90% to 100% concentration in the molecular proportion of about one to one for a period sufficient to effect sulfation but insufficient to effect substantial polymerization of said butene and hydrolyzing the butyl hydrogen sulfate formed.

9. In the process for producing alcohols from secondary olefines containing at least four carbon atoms to the molecule the step which comprises contacting the olefines with concentrated sulfuric acid in substantially equimolecular proportions for a period sufficient to effect sulfation and insufficient to effect substantial polymerization of said olefines.

10. In the process for producing alcohols from secondary olefines containing at least four carbon atoms to the molecule the step which comprises contacting the olefines with concentrated sulfuric acid in substantially equimolecular proportions at about normal temperature for a period sufficient to effect sulfation but insufficient to effect substantial polymerization of said olefines.

11. In the process for producing alcohols from secondary olefines containing at least four carbon atoms to the molecule the step which comprises contacting the olefines with sulfuric acid of 90% to 100% concentration in substantially equimolecular proportions for a period sufficient to effect sulfation but insufficient to effect substantial polymerization of said olefines.

12. In the process for producing alcohols from secondary olefines containing at least four carbon atoms to the molecule the step which comprises contacting the liquefied olefines with concentrated sulfuric acid under pressure at about normal temperature in substantially equimolecular proportions for a period sufficient to effect sulfation but insufficient to effect substantial polymerization of said olefines.

13. In the process for producing alcohols from secondary olefines containing at least four carbon atoms to the molecule the steps which comprise removing any iso-olefines present and thereafter contacting the olefines with sulfuric acid of 90% to 100% concentration in substantially equimolecular proportions for a period sufficient to effect sulfation but insufficient to effect substantial polymerization of said olefines.

14. In the process for producing alcohols from a mixture of paraffins and olefines containing secondary olefines possessing at least four carbon atoms to the molecule the steps which comprise removing from the mixture any iso-olefines present and thereafter contacting the mixture of paraffins and olefines with sulfuric acid of 90% to 100% concentration in the proportion of about one molecule of olefine to each molecule of acid present for a period sufficient to effect sulfation but insufficient to effect substantial polymerization of said olefines.

15. In the process for producing secondary butyl alcohol from a mixture of butane and butene the steps which comprise removing from the mixture any iso-butene present and thereafter contacting the mixture of butane and butene with sulfuric acid of 90% to 100% concentration in the proportion of about one molecule of butene to each molecule of acid present for a period sufficient to effect sulfation but insufficient to effect substantial polymerization of said butene.

16. In the process for producing secondary butyl alcohol from 1 and 2 butene the step which comprises contacting the butene with sulfuric acid of 90% to 100% concentration in the molecular proportion of about one to one for a period sufficient to effect sulfation but insufficent to effect substantial polymerization of said olefines.

17. In the process for producing secondary butyl alcohol from a liquid mixture of butane and butene the steps which comprise removing from the liquid mixture any iso-butene present and thereafter contacting the liquid mixture of butane and butene with sulfuric acid of 90% to 100% concentration in the proportion of about one molecule of butene to each molecule of acid present for a period sufficient to effect sulfation but insufficient to effect substantial polymerization of said butene.

18. In the process for producing secondary butyl alcohol from liquid 1 and 2 butene the step which comprises contacting the liquid butene with sulfuric acid of 90% to 100% concentration in the molecular proportion of about one to one for a period sufficient to effect sulfation but insufficient to effect substantial polymerization of said butene.

In testimony whereof, we have hereunto set our hands.

WILLIAM ENGS.
RICHARD Z. MORAVEC.